Patented Mar. 29, 1932

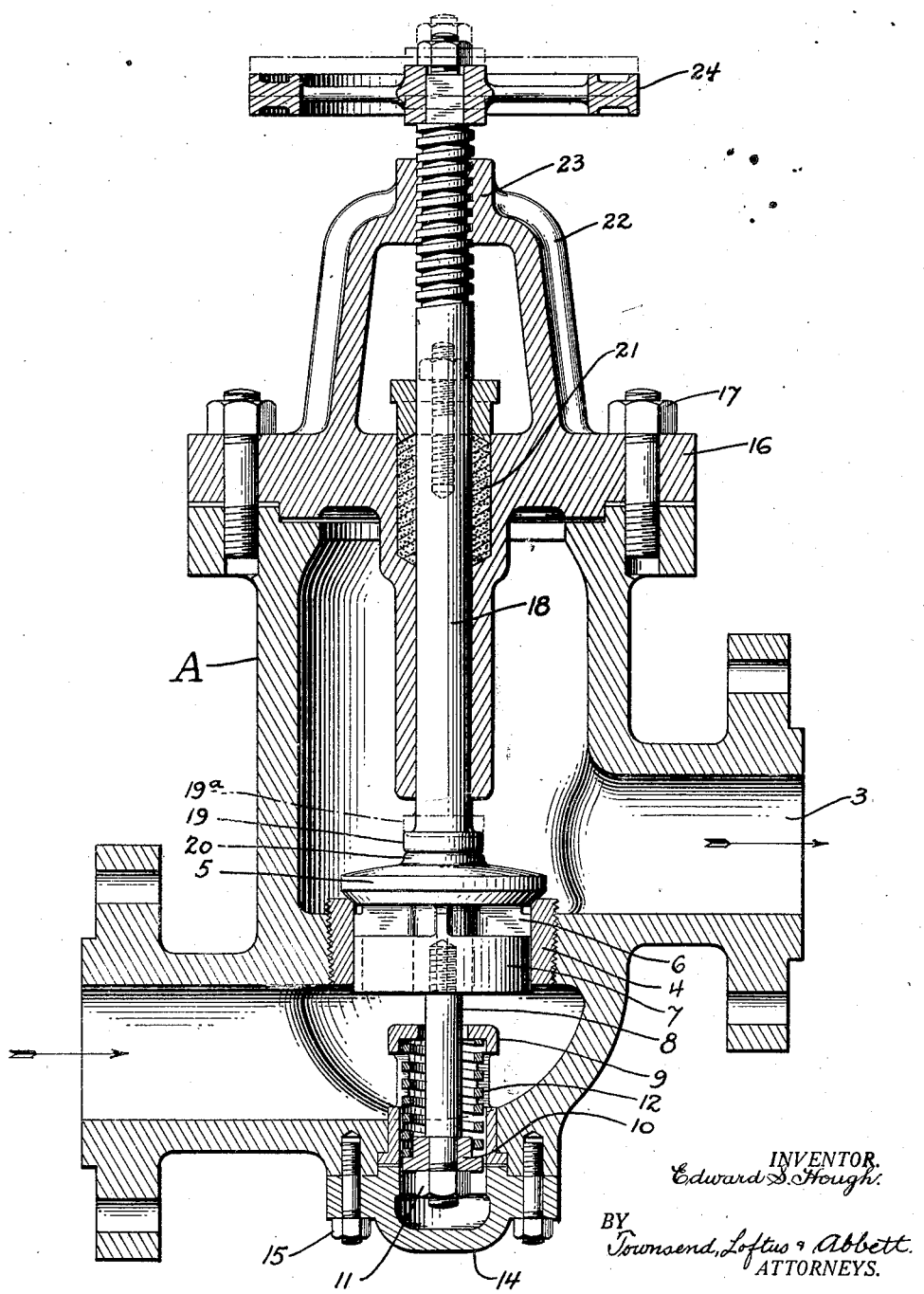

1,851,428

UNITED STATES PATENT OFFICE

EDWARD S. HOUGH, OF PIEDMONT, CALIFORNIA

VALVE

Application filed May 20, 1931. Serial No. 538,640.

This invention relates to valves, particularly to improvements on the valve structure shown in my former patent entitled "Feedwater valves", Number 1,101,933, issued June 13th, 1914.

The valve shown in my former patent above referred to was particularly intended for use as a check valve to be interposed between a feed water pump and a steam boiler. It was later used as a check valve on oil lines, for instance, between the feed pump and a retort or a cracking still, and when so used the spring which normally retained the check valve on the seat gave considerable trouble as the spring would tend to stick due to being gummed up with tar, carbon particles, sand, etc., and the spring was also subject to breakage hence requiring removal and renewal from time to time. Whether the spring would stick or break, the entire valve as constructed under my former patent would have to be taken completely apart in order to permit removal or renewal of the spring. This required considerable time and necessitated shutting down of the boiler, cracking still, etc., while repairs were taking place.

The object of the present invention is to provide a valve structure whereby the troubles above referred to are substantially eliminated; to generally improve and simplify the construction and operation of the valve and, further, to provide a valve structure which permits quick removal and replacement of the valve retaining spring without dissembling the valve.

The valve is shown by way of illustration in the accompanying drawing, in which—

The figure is a central, vertical section of the same.

Referring to the drawing, A indicates a housing in which is formed an inlet connection 2 and a discharge connection 3. Formed in the housing intermediate said connections is a port in which is mounted a removable valve seat member 4 and a valve 5, the valve shown in the present instance being of standard construction as it is provided with flanges 6 and a sleeve 7 whereby the valve is guided with relation to the seat.

The main function of the valve is that of a check valve and spring means are provided for normally retaining the valve in its seat. The spring means employed being, however, sufficiently resilient to permit opening of the valve when fluid under sufficient pressure enters the inlet 2. The spring mechanism whereby the valve is normally retained on its seat comprises a stem 8 suitably secured to the valve. The stem projects downwardly through a spring retaining cage 9 and the lower end of the stem carries a spring retaining washer 10 and a nut 11. A spring 12 is interposed between the upper end of the cage and the washer 10 and the tension of the spring is sufficient to normally retain the valve on its seat.

Where a valve of this character is used on oil lines and the like it is desirable that the spring retaining mechanism as a whole be accessible so that it may be quickly removed for inspection, renewal or repairs. In the present instance a cover plate 14 is provided. This is secured to the housing by means of bolts 15 and by removal of the bolts the cover plate is released, thus exposing the entire spring mechanism and permitting quick removal and replacement thereof.

Where heavy oils carrying sand or other impurities are being handled there is a tendency to clog the spring and cause it to stick. Such tendency is reduced to a minimum in this instance as the spring cage is slotted as shown and is furthermore disposed in the path of the incoming oil. The oil flows through the cage and between the convolutions of the spring and as such tends to maintain it in a fairly clean condition.

The valve shown in the present instance does not only function as a check valve as it prevents a reverse flow through the valve but it also functions as a shut-off valve, for instance when removing the spring mechanism. The means employed for this purpose comprises a head member 16 secured on the upper end of the housing by bolts 17. Extending through the head member is a rod 18 and formed on the lower end thereof is a head member 19. This head member engages a boss 20 formed on the upper face of the valve and when such engagement is maintained the valve is positively held on its seat and as such functions as a shut-off valve. Under normal operating conditions the rod 18 and head member 19 are raised, for instance to the dotted line position indicated at 19a, and as the amount the rod and head member is raised is controllable the lift of the valve when it is functioning as a check valve may be regulated. The head member 16 is provided with a stuffing box 21 to prevent leakage around the rod and is provided with upwardly extending arms 22 and a nut member 23. The upper end of the rod has threaded engagement with the nut 23 and is provided with a hand wheel 24 whereby the rod may be rotated. During rotation the threaded engagement between the rod and the nut causes the rod to rise and fall as the case may be and it is thus possible to regulate the lift of the check valve and it is also possible to secure the valve snugly on its seat, thus permitting it to function as a shut-off valve.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. In a valve of the character described a housing having an inlet and an outlet connection formed thereon, a port formed on the housing between said connections, a valve mounted in said port and controlling the flow of fluid from the inlet to the outlet, a stem on the valve, a spring cage mounted in one end of the housing through which the valve stem extends, a spring washer and nut on the end of said stem, a spring interposed between the washer and the cage, and a removable cover member on the housing through which the spring, the spring washer and nut are removable.

2. In a valve of the character described a housing having an inlet and an outlet connection formed thereon, a port formed on the housing between said connections, a valve mounted in said port and controlling the flow of fluid from the inlet to the outlet, a stem on the valve, a spring cage mounted in one end of the housing through which the valve stem extends, a spring washer and nut on the end of said stem, a spring interposed between the washer and the cage, a removable cover member on the housing through which the spring, the spring washer and nut are removable, a screw rod extending through the opposite end of the housing and engageable with the opposite side of the valve to retain it on its seat, and means for adjusting the position of the screw rod to regulate opening movement of the valve.

EDWARD S. HOUGH.